(12) United States Patent
Ellis et al.

(10) Patent No.: US 6,612,499 B2
(45) Date of Patent: Sep. 2, 2003

(54) CALIBRATION CARTRIDGE FOR AUTOMATED CARTRIDGE LIBRARY AND METHOD OF USING SAME

(75) Inventors: John Ellis, Louisville, CO (US); Alan Butler, Boulder, CO (US); Christopher J. Clos, Boulder, CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 10/053,899

(22) Filed: Jan. 24, 2002

(65) Prior Publication Data

US 2003/0137766 A1 Jul. 24, 2003

(51) Int. Cl.$^7$ .................................................. G06K 7/00
(52) U.S. Cl. ...................................................... 235/486
(58) Field of Search ................................ 235/486, 475, 235/476, 477, 478, 479, 441; 360/69; 436/527; 347/2, 14

(56) References Cited

U.S. PATENT DOCUMENTS

| | | |
|---|---|---|
| 3,833,807 A | 9/1974 | Takeda |
| 4,754,397 A | 6/1988 | Varaiya et al. |
| 4,869,591 A | 9/1989 | MacGregor |
| 4,908,715 A | 3/1990 | Krum et al. |
| 4,918,548 A | 4/1990 | O'Donnell et al. |
| 4,972,277 A | 11/1990 | Sills et al. |
| 4,984,106 A | 1/1991 | Herger et al. |
| 5,021,902 A | 6/1991 | Ishikawa et al. |
| 5,059,772 A | 10/1991 | Younglove |
| 5,103,986 A | 4/1992 | Marlowe |
| 5,184,260 A | 2/1993 | Pierrat |
| 5,237,467 A | 8/1993 | Marlowe |
| 5,373,489 A | 12/1994 | Sato et al. |
| 5,402,283 A | 3/1995 | Yamakawa et al. |
| 5,414,519 A | 5/1995 | Han |
| 5,416,653 A | 5/1995 | Marlowe |
| 5,469,310 A | 11/1995 | Slocum et al. |
| 5,487,579 A | 1/1996 | Woodruff et al. |
| 5,498,116 A | 3/1996 | Woodruff et al. |
| 5,502,697 A | 3/1996 | Taki |
| 5,512,761 A | 4/1996 | Winkelmann |
| 5,555,143 A | 9/1996 | Hinnen et al. |
| 5,659,440 A | 8/1997 | Acosta et al. |
| 5,661,287 A | 8/1997 | Schaefer et al. |
| 5,718,339 A | 2/1998 | Woodruff et al. |
| 5,739,978 A | 4/1998 | Ellis et al. |
| 5,768,047 A | 6/1998 | Ulrich et al. |
| 5,894,941 A | 4/1999 | Woodruff |
| 5,902,253 A * | 5/1999 | Pfeiffer et al. ............. 600/584 |

(List continued on next page.)

FOREIGN PATENT DOCUMENTS

JP          60-225002 A          11/1985

OTHER PUBLICATIONS

U.S. patent application SN 08/970,205, entitled Cartridge Library with Cartridge Loader Mounted on Moveable Drive Assembly Nov. 14, 1997.

(List continued on next page.)

Primary Examiner—Thien M. Le
(74) Attorney, Agent, or Firm—Nixon & Vanderhye, P.C.

(57) ABSTRACT

A calibration cartridge (20) for an automated media library (60) comprises a cartridge case (30) having a calibration surface (35) and an electromagnetic transmissive channel (40). The electromagnetic transmissive channel transmits electromagnetic radiation incident upon the calibration surface at a radiation reception port (42) in a first position of the calibration cartridge so that the electromagnetic radiation travels interiorily through the calibration case and exits from the calibration cartridge at a radiation exit aperture (44) in a second position on the calibration surface. The calibration cartridge is usable in an automated information storage library which comprises plural cartridge-accommodating cells (64) and a drive (68).

56 Claims, 13 Drawing Sheets

U.S. PATENT DOCUMENTS

| | | | |
|---|---|---|---|
| 6,005,745 A | | 12/1999 | Filkins et al. |
| 6,008,964 A | | 12/1999 | Goodknight et al. |
| 6,144,521 A | | 11/2000 | Egan et al. |
| 6,153,999 A | | 11/2000 | Borrego |
| 6,175,467 B1 | | 1/2001 | Schneider et al. |
| 6,224,180 B1 | * | 5/2001 | Pham-Van-Diep et al. ..... 347/2 |
| 6,239,941 B1 | | 5/2001 | Small |
| 6,242,267 B1 | * | 6/2001 | Herron et al. ............... 436/527 |
| 6,302,507 B1 | * | 10/2001 | Prakash et al. ................ 347/14 |
| 2002/0101676 A1 | * | 8/2002 | Ellis ............................. 360/69 |

OTHER PUBLICATIONS

U.S. patent application SN 09/121,541, entitled "Cartridge Library and Method of Opeation" Jul. 24, 1998.

U.S. patent application Ser. No. 09/708,433, entitled "Cartridge Library" Nov. 9, 2000.

U.S. patent application Ser. No. 09/708,432, entitled "Cartridge Picker Robot with Ribbon Cable for Cartridge Library" Nov. 9, 2000.

U.S. patent application Ser. No. 09/708,739, filed Nov. 9, 2000, entitled "Cartridge Overinsertion Protection for Cartridge Library".

U.S. patent application Ser. No. 09/708,451, entitled "Adjustable Mounting for Barcode Reader with Backlash Prevention" Nov. 9, 2000.

U.S. Design patent application Ser. No. 29/132,408, entitled "Cartridge Libraries" Nov. 9, 2000.

U.S. Design patent application Ser. No. 29/132,407, entitled "Cartridge Magazine" Nov. 9, 2000.

* cited by examiner

| Fig. 5A | Fig. 5B |

Fig. 5

CALIBRATION CARTRIDGE FOR AUTOMATED CARTRIDGE LIBRARY AND METHOD OF USING SAME

BACKGROUND

1. Field of the Invention

The present invention pertains to the storage of information, and particularly to automated cartridge handling systems such as cartridge libraries which store cartridges or cassettes of magnetic tape.

2. Related Art and Other Considerations

In the early days of computers, information requiring storage could be transmitted from a computer to a tape drive, whereat the information was magnetically recorded on or read from a large reel of tape. Upon completion of an operation of recording on the tape, for example, the reel would be removed manually from the tape drive and mounted in a rack. Another reel from the rack could then be manually mounted, if necessary, in the drive for either an input (tape reading) or output (recording to tape) operation.

Eventually it became popular to enclose magnetic tape in a cartridge, the cartridge being considerably smaller than the traditional tape reels. While many persons are familiar with tape cartridges of a type which can be loaded into a "tape deck" for reproduction of audio information (e.g., music), it is not as commonly realized that similar cartridges, although of differing sizes, can be used to store such information as computer data. For years now magnetic tape cartridges have proven to be an efficient and effective medium for data storage, including but not limited to computer back-up.

Large computer systems have need to access numerous cartridges. To this end, automated cartridge handling systems or libraries for cartridges have been proposed for making the cartridges automatically available to the computer. Many of these automated libraries resemble jute boxes. Typically, prior art automated cartridge libraries have an array of storage positions for cartridges, one or more tape drives, and some type of automated changer or cartridge engagement/transport mechanism for picking or gripping a cartridge and moving the cartridge between a storage position and the tape drive.

Important to the automation of cartridge libraries as previously known has been the provision of the cartridge changer or cartridge engagement/transport mechanism for picking or gripping a cartridge and moving the cartridge between a storage position and the tape drive. Such robotic mechanisms, often called a cartridge "picker" or "gripper", is typically mounted in a library frame in order to introduce and remove cartridges relative to one or more stationary drives. The stationary drive and the picker are typically mounted to the same basic frame structure of the library.

The following United States patents and patent applications, all commonly assigned herewith and incorporated herein by reference, disclose various configurations of automated cartridge libraries, as well as subcomponents thereof (including cartridge engagement/transport mechanisms, entry/exit ports, and storage racks for housing cartridges):

U.S. Pat. No. 4,984,106 to Herger et al., entitled "CARTRIDGE LIBRARY SYSTEM AND METHOD OF OPERATION THEREOF".

U.S. Pat. No. 4,972,277 to Sills et al., entitled "CARTRIDGE TRANSPORT ASSEMBLY AND METHOD OF OPERATION THEREOF".

U.S. Pat. No. 5,059,772 to Younglove, entitled "READING METHOD AND APPARATUS FOR CARTRIDGE LIBRARY".

U.S. Pat. No. 5,103,986 to Marlowe, entitled "CARTRIDGE RACK".

U.S. Pat. Nos. 5,237,467 and 5,416,653 to Marlowe, entitled "CARTRIDGE HANDLING APPARATUS AND METHOD WITH MOTION-RESPONSIVE EJECTION".

U.S. Pat. No. 5,498,116 to Woodruff et al., entitled "ENTRY-EXIT PORT FOR CARTRIDGE LIBRARY".

U.S. Pat. No. 5,487,579 to Woodruff et al., entitled "PICKER MECHANISM FOR DATA CARTRIDGES".

U.S. Pat. No. 5,718,339 to Woodruff et al., entitled "CARTRIDGE RACK AND LIBRARY FOR ENGAGING SAME".

U.S. Pat. No. 5,739,978, entitled "CARTRIDGE HANDLING SYSTEM WITH MOVING I/O DRIVE".

U.S. Pat. No. 6,008,964, entitled "CARTRIDGE LIBRARY AND METHOD OF OPERATION THEREOF".

U.S. patent application Ser. No. 08/970,205, entitled "CARTRIDGE LIBRARY WITH CARTRIDGE LOADER MOUNTED ON MOVABLE DRIVE ASSEMBLY".

U.S. patent application Ser. No. 09/121,541, entitled "CARTRIDGE LIBRARY AND METHOD OF OPERATION".

U.S. Pat. No. 6,005,745 application Ser. No. 09/121,816, entitled "CARTRIDGE LIBRARY WITH ENTRY/EXIT PORT AND METHOD OF OPERATION THEREOF".

U.S. Pat. No. 6,239,941, entitled "CARTRIDGE LIBRARY AND METHOD OF OPERATION".

U.S. Pat. No. 6,144,521, entitled "CARTRIDGE MAGAZINE AND LIBRARY EMPLOYING SAME".

U.S. patent application Ser. No. 09/121,817, entitled "DRIVE CARRIER AND CARTRIDGE LIBRARY EMPLOYING SAME".

U.S. patent application Ser. No. 09/708,433, entitled "CARTRIDGE LIBRARY".

U.S. patent application Ser. No. 09/708,432, entitled "CARTRIDGE PICKER ROBOT WITH RIBBON CABLE FOR CARTRIDGE LIBRARY".

U.S. patent application Ser. No. 09/708,451, entitled "ADJUSTABLE MOUNTING FOR BARCODE READER WITH BACKLASH PREVENTION".

U.S. Design patent application Ser. No. 29/132,408, entitled "CARTRIDGE LIBRARIES".

U.S. Design patent application Ser. No. 29/132,407, entitled "CARTRIDGE MAGAZINE".

In an automated tape library, one of the important tasks is to closely align the tape handling mechanism (the gripper) to tape cartridge storage cells ill the library and to tape drive openings. This is important because misalignment can make picking and placing tapes difficult and error prone.

Various means and techniques have been employed to accomplish proper alignment. Most of these techniques involve use of optical sensors. For example, a first common technique is to shine a light at a target associated to the cartridge location and sense the location of the reflection. A second common technique is to shine a light through an stationary aperture associated to the cartridge position and sense the location of the transmitted light.

The problem with the first technique is that the light source and the detector must be aimed to converge at a certain depth. If this depth cannot be controlled accurately, the axes converge in front of or behind the reflective surface. Also, the convergence of the optical axes cause parallax which confuses lateral position with depth.

A problem with the second technique is that supporting an emitter or detector on the side of the aperture opposite the robot and having it move with the robot is difficult.

What is needed, therefore, and an object of the present invention, is a calibration cartridge and technique of usage thereof (e.g., in an automated cartridge library) which facilitates calibration of locations in the automated cartridge library.

BRIEF SUMMARY

A calibration cartridge for an automated media library comprises a cartridge case having a calibration surface and an electromagnetic transmissive channel. The electromagnetic transmissive channel transmits electromagnetic radiation incident upon the calibration surface at a radiation reception port in a first position of the calibration cartridge so that the electromagnetic radiation travels interiorily through the calibration case and exits from the calibration cartridge at a radiation exit aperture in a second position on the calibration surface. The electromagnetic transmissive channel is preferably an electromagnetic conductor, such as an optical fiber or light pipe, for example.

The electromagnetic transmissive channel is situated in an interior of the cartridge case. The electromagnetic transmissive channel has a first end which terminates at the first position (e.g., the radiation reception port) on the calibration surface and a second end which directs electromagnetic radiation transmitted by the electromagnetic transmissive channel to the second position (e.g., the radiation exit aperture) on the calibration surface. In one example embodiment, the second end of the electromagnetic transmissive channel terminates interiorily in the cartridge case and directs the electromagnetic radiation toward the radiation exit aperture.

The calibration cartridge is usable in an automated information storage library which comprises plural cartridge-accommodating cells and a drive. Each of the plural cells is adapted to accommodate a media cartridge, the media cartridge containing an information storage media (e.g., magnetic tape). The drive transduces information with respect to the information storage media of a selected media cartridge inserted into the drive. The calibration cartridge is transportable by a cartridge transport system of the library for insertion into one of the plural cells and the drive.

The cartridge transport system comprises a cartridge gripper which selectively inserts the calibration cartridge into a calibration position in one of the plural cells and the drive, The cartridge gripper has an electromagnetic emitter and an electromagnetic detector. The electromagnetic emitter of the cartridge gripper is positioned to be essentially aligned with the radiation reception port of the calibration cartridge when the calibration cartridge is in the calibration position, and the cartridge gripper is proximate the calibration position. The electromagnetic detector of the cartridge gripper is proximate the radiation exit aperture of the calibration cartridge when the calibration cartridge is in the calibration position, but whether the electromagnetic radiation emitted from the radiation exit aperture of the calibration cartridge reaches the detector depends on a position of the cartridge gripper relative to calibration cartridge as the cartridge gripper is moved through a range of positions along differing directions or axes of movement.

In an illustrated embodiment, the radiation exit aperture is a quadrilateral-shaped aperture (e.g., a rectangular aperture). As another aspect, a dispersion angle of the electromagnetic emitter has a predetermined relationship relative to the radiation exit aperture to ensure that at least a portion of a cone of electromagnetic radiation emitted from the emitter of the cartridge gripper is incident upon the radiation reception port of the calibration cartridge regardless of the extent of movement of cartridge gripper through the range of positions.

A method of operating (e.g., calibrating and/or inventorying) an automated information storage library comprises uses the cartridge gripper to transport the calibration cartridge to a calibration position whereat the calibration cartridge is inserted into one of a cartridge-accommodating cell of the library, a calibration cartridge storage cell, and the drive. The cartridge gripper emits electromagnetic radiation incident upon the calibration cartridge which occupies the calibration position. The electromagnetic radiation emitted from the cartridge gripper is transmitted through an interior portion of the calibration cartridge to the radiation exit aperture of the calibration cartridge. Any electromagnetic radiation exiting from the radiation exit aperture of the calibration cartridge is used (e.g., detected) to ascertain a spatial description of the calibration position (e.g., spatial coordinates of the calibration position).

In determining the spatial description of the calibration position, the cartridge gripper while emitting the electromagnetic radiation is translated in a first direction and then in a second direction proximate the calibration cartridge. The electromagnetic radiation emitted from the emitter of the cartridge gripper is incident upon a radiation reception port of the calibration cartridge, so that the electromagnetic radiation can be conducted through the electromagnetic transmissive channel to the radiation exit aperture. Detection by the detector of the cartridge gripper of emission transitions from the radiation exit aperture of the calibration cartridge while the cartridge gripper moves along the first direction enables location of a first direction coordinate of a center of the radiation exit aperture. Similarly, detection by the detector of the cartridge gripper of emission transitions from the radiation exit aperture of calibration cartridge while the cartridge gripper moves along the second direction enables location of a second direction coordinate of a center of the radiation exit aperture. The electromagnetic radiation is emitted from the cartridge gripper with a sufficiently large dispersion angle whereby the radiation reception port of the calibration cartridge remains irradiated as the cartridge gripper is translated through a range of positions in the first direction. At some position in the range the detector of the cartridge gripper receives electromagnetic radiation emitted from the radiation exit aperture of the calibration cartridge and at other positions of the range the detector does not receive the electromagnetic radiation emitted from the radiation exit aperture of the calibration cartridge.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5 is a diagrammatic view showing a relationship of FIG. 5A and FIG. 5B.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details In other instances, detailed descriptions of well-known devices, circuits, and methods are omitted so as not to obscure the description of the present invention with unnecessary detail.

Figure 1:
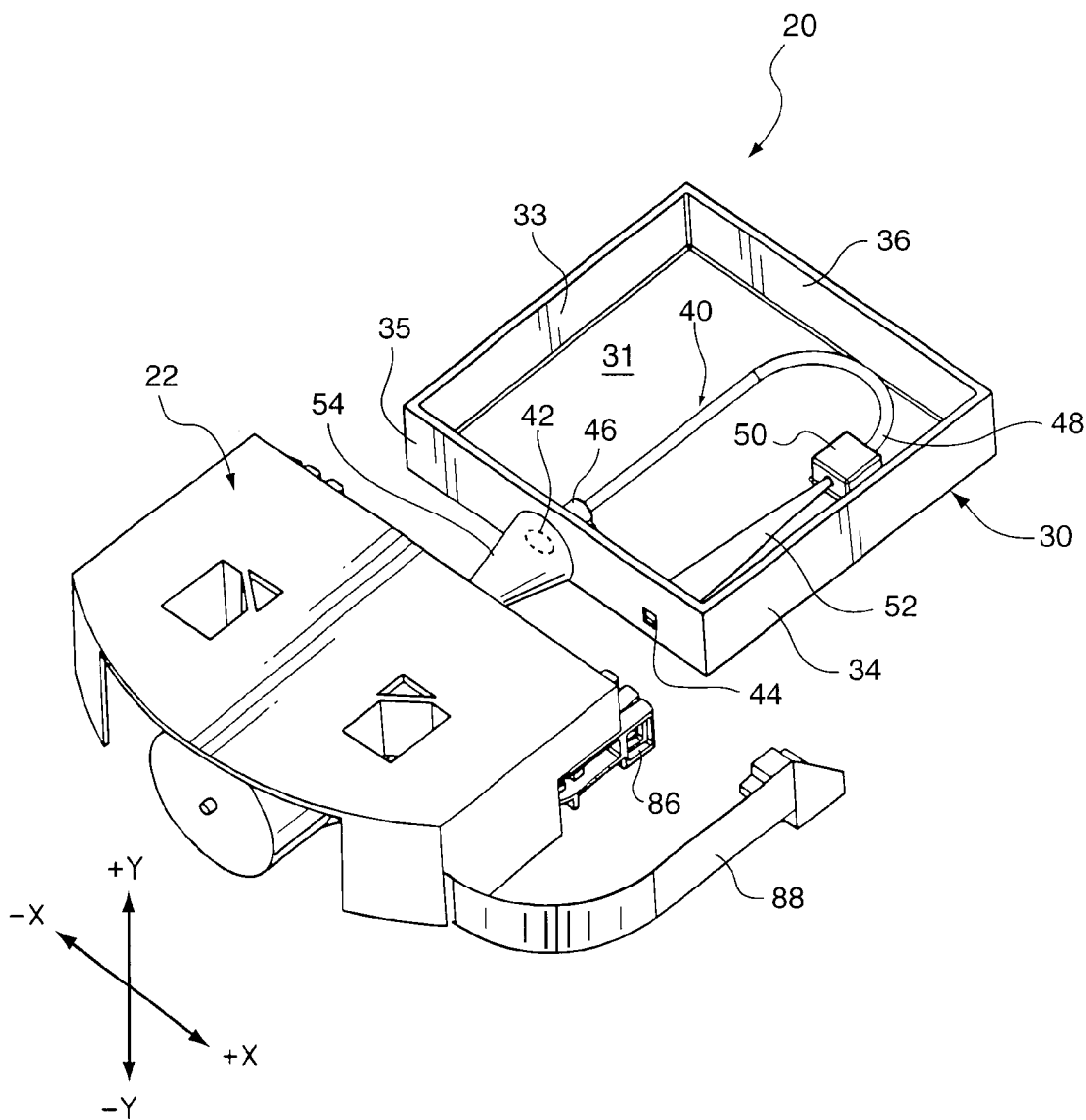
FIG. 1 is a top, front isometric view of an example embodiment of a calibration cartridge proximate a cartridge gripper, with a top cover of the calibration cartridge removed.

FIG. 1 shows an example calibration cartridge 20 proximate a cartridge gripper 22. The calibration cartridge 20 has a case 30. The case 30 of calibration cartridge 20 has a bottom wall 31; an optional top wall (removed and thus unillustrated in FIG. 1), left side wall 33; right sidewall 34; front side wall 35; and rear side wall 36. In the illustrated embodiment, the front side wall 35 serves as a calibration surface for calibration cartridge 20.

As understood from an ensuing discussion of a library in which it operates, the calibration cartridge 20 is a surrogate type cartridge that is stored in dedicated slot of the library. The calibration cartridge 20 generally has the same dimensions as a standard tape cartridge (e.g., standard media cartridge), except that the calibration cartridge 20 has generous lead-ins (chamfers or radii), e.g., on the front end that allow calibration cartridge 20 to be placed in a storage slot or drive even if it is not precisely aligned.

The calibration cartridge 20 further includes an electromagnetic transmissive channel 40. Preferably at least a portion, and most preferably all, of electromagnetic transmissive channel 40 is situated in an interior of case 30 of calibration cartridge 20. The electromagnetic transmissive channel 40 transmits electromagnetic radiation incident upon a radiation reception port 42 at a first position of the calibration surface 35 so that the electromagnetic radiation travels interiorily through the calibration case 30 via the electromagnetic transmissive channel 40, and exits from the calibration cartridge at a radiation exit aperture 44 which is located at a second position on calibration surface 35.

The electromagnetic transmissive channel 40 is preferably an electromagnetic conductor, such as an optical fiber or light pipe, just to name two examples. A first end 46 of electromagnetic transmissive channel 40 serves as a radiation-receiving end of electromagnetic transmissive channel 40 and is attached, e.g., by a coupler or the like, to a back side of calibration surface 35 at the first position (e.g., at the radiation reception port 42). A second end 48 of electromagnetic transmissive channel 40 serves as a radiation-emitting end of electromagnetic transmissive channel 40, and is terminated in a mounting block 50 secured, e.g., to bottom wall 31 of calibration cartridge 20 in a manner so that in the interior of case 30 the second end 48 emits or directs a cone 52 of radiation toward a backside of calibration surface 35 at the second position where the radiation exit aperture 44 is formed.

It should be understood that, depending on the cross-sectional diameter of a fiber or cable comprising electromagnetic transmissive channel 40 relative to the size of radiation exit aperture 44, the second end 48 of electromagnetic transmissive channel 40 may terminate closer or farther with respect to radiation exit aperture 44, and may even terminate substantially flush with the back of calibration surface 35 at radiation exit aperture 44.

The electromagnetic transmissive channel 40 is preferably an electromagnetic conductor, such as an optical fiber or light pipe just to name two examples. A first end 46 of electromagnetic transmissive channel 40 serves as a radiation-receiving end of electromagnetic transmissive channel 40 and is attached, e.g., by a coupler or the like, to a back side of calibration surface 35 at the first position (e.g., at the radiation reception port 42). A second end 48 of electromagnetic transmissive channel 40 serves as a radiation-emitting end of electromagnetic transmissive channel 40, and is terminated in a mounting block 50 secured, e.g., to bottom wall 31 of calibration cartridge 20 in a manner so that in the interior of case 30 the second end 48 emits or directs a cone 52 of radiation toward a backside of calibration surface 35 at the second position where the radiation exit aperture 44 is formed.

In an illustrated embodiment, the radiation exit aperture is a quadrilateral-shaped aperture. While other geometric forms for radiation exit aperture 44 are also suitable, a center of a quadrilateral-shaped aperture is perhaps easier to locate than an aperture of another shape. As just two examples, the quadrilateral-shaped aperture 44 may take the form of a square or rectangle. As another aspect explained subsequently, a dispersion angle of an electromagnetic emitter of the cartridge gripper 22 has a predetermined relationship relative to the radiation exit aperture 44 so that, e.g., an electromagnetic cone 54 emitted therefrom is of a diameter which substantially illuminates the radiation reception port 42 on calibration surface 35 of calibration cartridge 20 regardless of movement of cartridge gripper 22 within a predetermined range of positions along either the X axis or the Y axis.

FIG. 8–FIG. 12 show another embodiment of a calibration cartridge 20 wherein the electromagnetic transmissive channel 40 takes the form of a light pipe. The light pipe shown in FIG. 8 has an essentially "J" shape, with a tall leg of the J terminating at the radiation reception port 42 and a short leg of the J terminating in the interior of case 30 in alignment with radiation exit aperture 44. The J-shaped light pipe of the FIG. 8 embodiment has two sides 40a, 40b which serve, e.g., for direct internal reflection of the electromagnetic (e.g., optical) radiation transmitted through the light pipe. The light pipe of the FIG. 8 embodiment can be positioned on bottom wall 31 using mounting guides 57. A retaining bar 58 fits over the light pipe and receives fasteners 59 which extend through retaining bar 58 into appropriate mounting guides 57 for securing the light pipe to bottom wall 31 of cartridge case 30. In the embodiment of FIG. 8–FIG. 12, it is to be noted that the positions of radiation reception port 42 and radiation exit aperture 44 are essentially reversed from those of the first embodiment.

Figure 4:
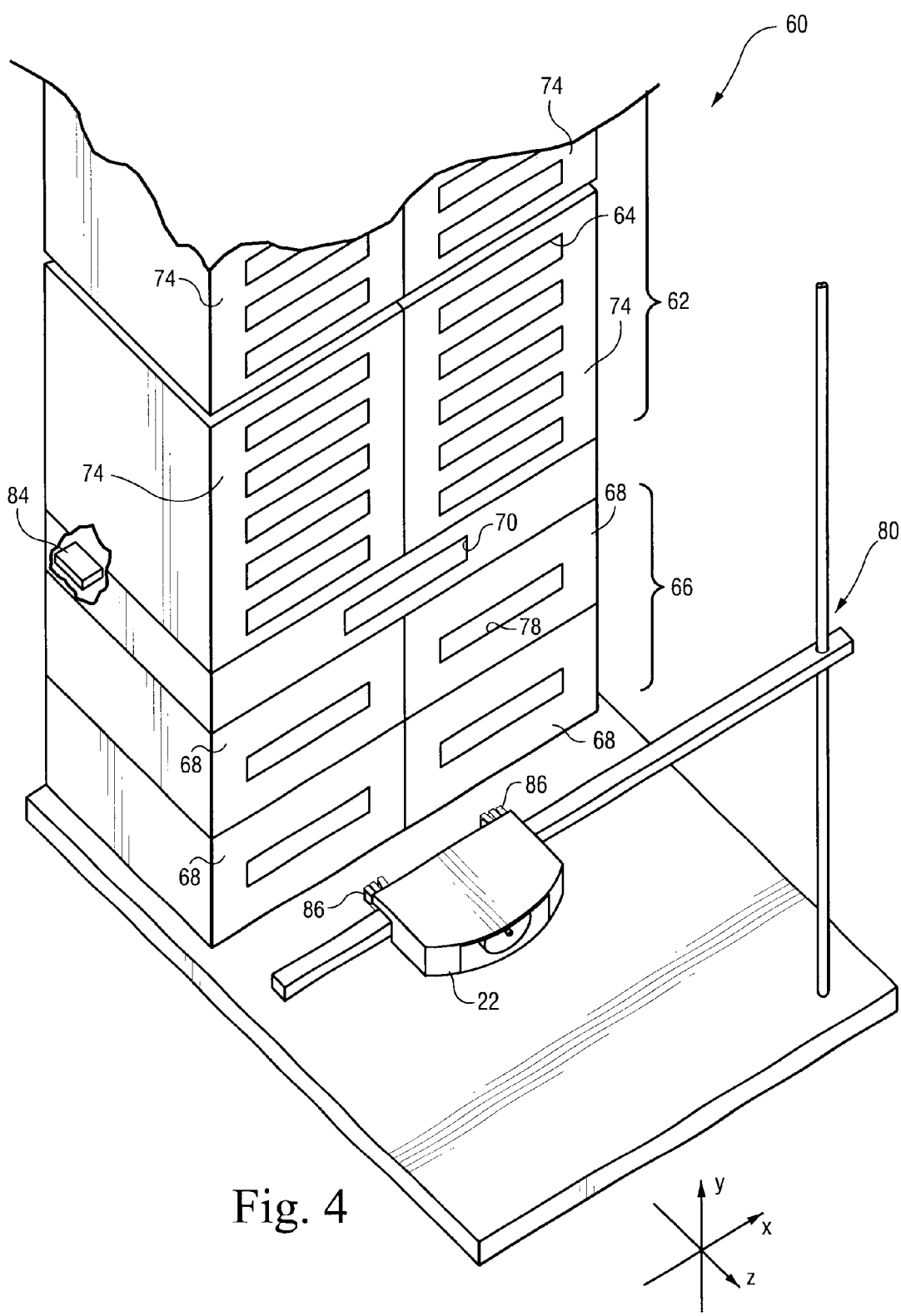
FIG. 4 is an isometric view of an example embodiment of an automated cartridge library which utilizes the example calibration cartridge of FIG. 1.

The calibration cartridge is usable in an automated information storage library such as example library 60 illustrated in FIG. 4. The library 60 has a media cartridge section 62 which comprises plural cartridge-accommodating cells 64. Further, library 60 has a drive section 66 comprised of one or more tape drives 68, and a calibration cartridge storage cell 70.

Each of the plural cells 64 is adapted to accommodate a media cartridge. Although not specifically illustrated herein, it will be understood that such a media cartridge contains an information storage media (e.g., magnetic tape). For the particular embodiment of library 60 shown in FIG. 4, the media cartridge section 62 comprises plural cartridge magazines 74, with each magazine 74 defining one or more (e.g., five) media cartridge-accommodating cells 64. Moreover, drive section 66 is shown as including plural (e.g., four) drives 68. At any given time, one of the drives 68 can transduce information with respect to the information storage media of a selected media cartridge inserted into a slot 78 of the drive.

The usage of magazines per se, the number and/or type of magazines employed, the number of cells per magazine, and the number of drives, are all optional aspects of library 60 and in no way limit the present invention.

The library 60 also includes a cartridge transport system generally depicted by reference numeral 80 in FIG. 4. The cartridge transport system 80 comprises the previously-mentioned cartridge gripper 22, as well as various means for displacing or moving cartridge gripper 22 along the appropriate axes, e.g., the three axes X, Y, and Z shown in FIG. 4. For libraries (such as carrousel or silo-type libraries) in which the is cartridge gripper 22 has circular or arcuate travel, other coordinate systems are utilized (e.g., polar coordinates). Those skilled in the art will appreciate that such means can include various subsystems and structures, such as motors (e.g., stepper motors), belts, tracks, for moving cartridge gripper 22 along the three axes in the course of library operation, including a library calibration procedure which forms one phase or aspect of library operation.

Operation of the cartridge transport system 80, and indeed the entire library 60, is preferably under supervision of one or more processors or controllers, such as microprocessor 84. The microprocessor 84 shown in FIG. 4 as situated in a rear portion or electronics board of library 60, represents such supervisor/controller. It will be further understood that the location of such supervisor within library 60 is not germane to the present invention, and further that the supervisory/control functions of library 60 can be distributed to other processors, etc., situated elsewhere within library 60.

The cartridge gripper 22 has a pair of gripper fingers or gripper jaws 86. The gripper jaws 86 can be actuated to selectively engage a cartridge between the gripper jaws 86 (e.g., media cartridge or calibration cartridge), or to release a cartridge from its grasp. Operation of cartridge gripper 22 including actuation of its gripper jaws 86 is essentially in accordance with signals slit to cartridge gripper 22 over a ribbon cable 88 (from, e.g., microprocessor 84). Various internal elements of an example embodiment cartridge gripper 22 are illustrated in FIG. 4, and understood by the person skilled in the art, e.g., with reference to various publications such as some of the patents already incorporated herein by reference.

While in general operation the cartridge gripper 22 moves media cartridges between one or more media cartridge-accommodating cells 64, and between media cartridge-accommodating cells 64 to one or more drives 68, in the calibration procedure hereinafter described cartridge gripper 22 moves the calibration cartridge 20 into each of the calibration cartridge storage cell 70, the drive(s) 68, and the media cartridge-accommodating cells 64. Thus, as hereinafter explained, the cartridge gripper 22 of cartridge transport system 80 selectively inserts the calibration cartridge 20 into a calibration position. The calibration position can be either one of the plural cells or a slot 78 one of the drives 68, depending on which position is being calibrated for sake of ascertaining its calibrated location.

As mentioned previously, calibration cartridge 20 contains electromagnetic transmissive channel 40 which can take the form, e.g., of a fiber optic cable or a light pipe. Both first end 46 and second end 48 of electromagnetic transmissive channel 40 face, i.e., are oriented toward, cartridge gripper 22. The cartridge gripper 22 has a radiation emitter 90 (see FIG. 2) from which the cone 54 of electromagnetic radiation is emitted, as well as a detector 92 which is sensitive to the wavelength of the electromagnetic radiation emitted by emitter 90. The electromagnetic radiation emitted by emitter 90 and detected by detector 92 can be any suitable wavelength, e.g., visible and/or infrared. The emitter 90 and detector 92 are directed or oriented toward the calibration cartridge 20, and are spaced apart along axis X by a predetermined distance.

The calibration cartridge 20 is located vertically by its bottom wall 31 and laterally by its side walls 33, 34. The detector 92 is positioned to features on the gripper 22 that locate the calibration cartridge 20 to small tolerances. The vertical position of emitter 90 and detector 92 are held to small tolerances relative to guide rails on a reach portion of cartridge gripper 22, the guide rails supporting the calibration cartridge 20 when cartridge 20 is in cartridge gripper 22. The lateral (X axis) position of emitter 90 and detector 92 are held to small tolerances to guide posts on the reach portion of cartridge gripper 22. The guide posts locate calibration cartridge 20 when it is in cartridge gripper 22.

Figure 2:
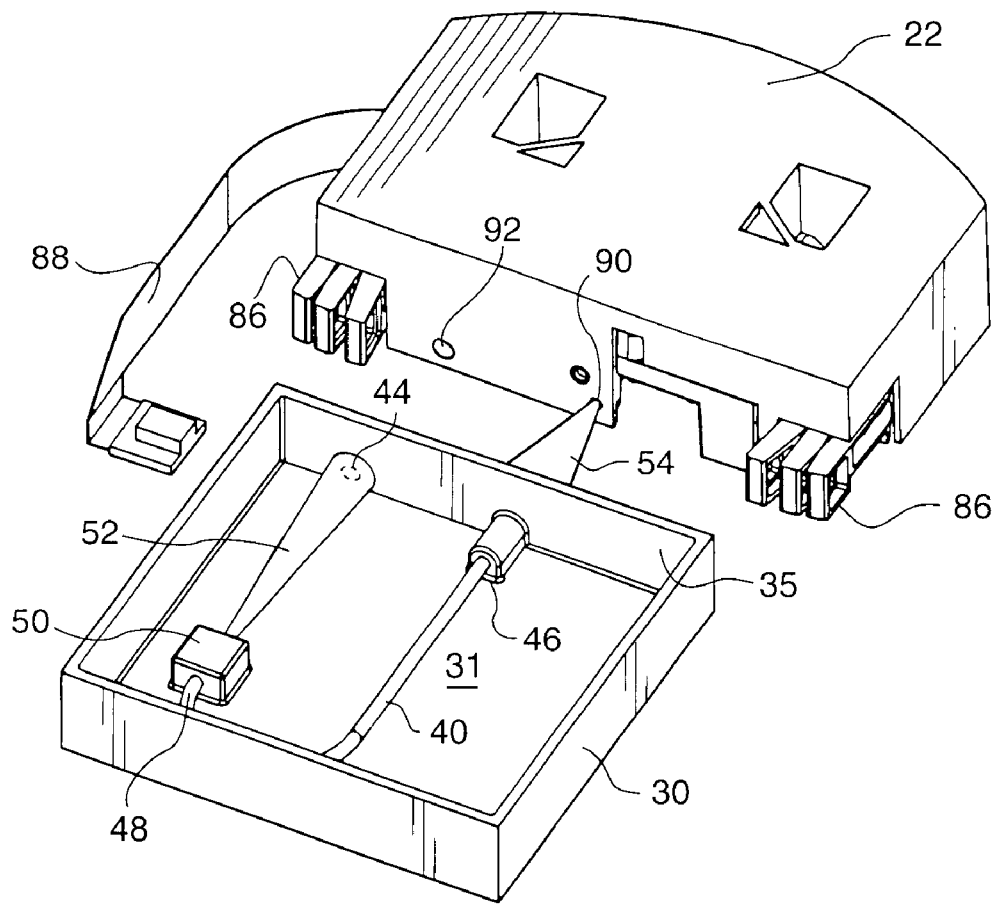
FIG. 2 is a top, rear isometric view of the calibration cartridge and cartridge gripper of FIG. 1, with a top cover of the calibration cartridge removed.
Figure 3:
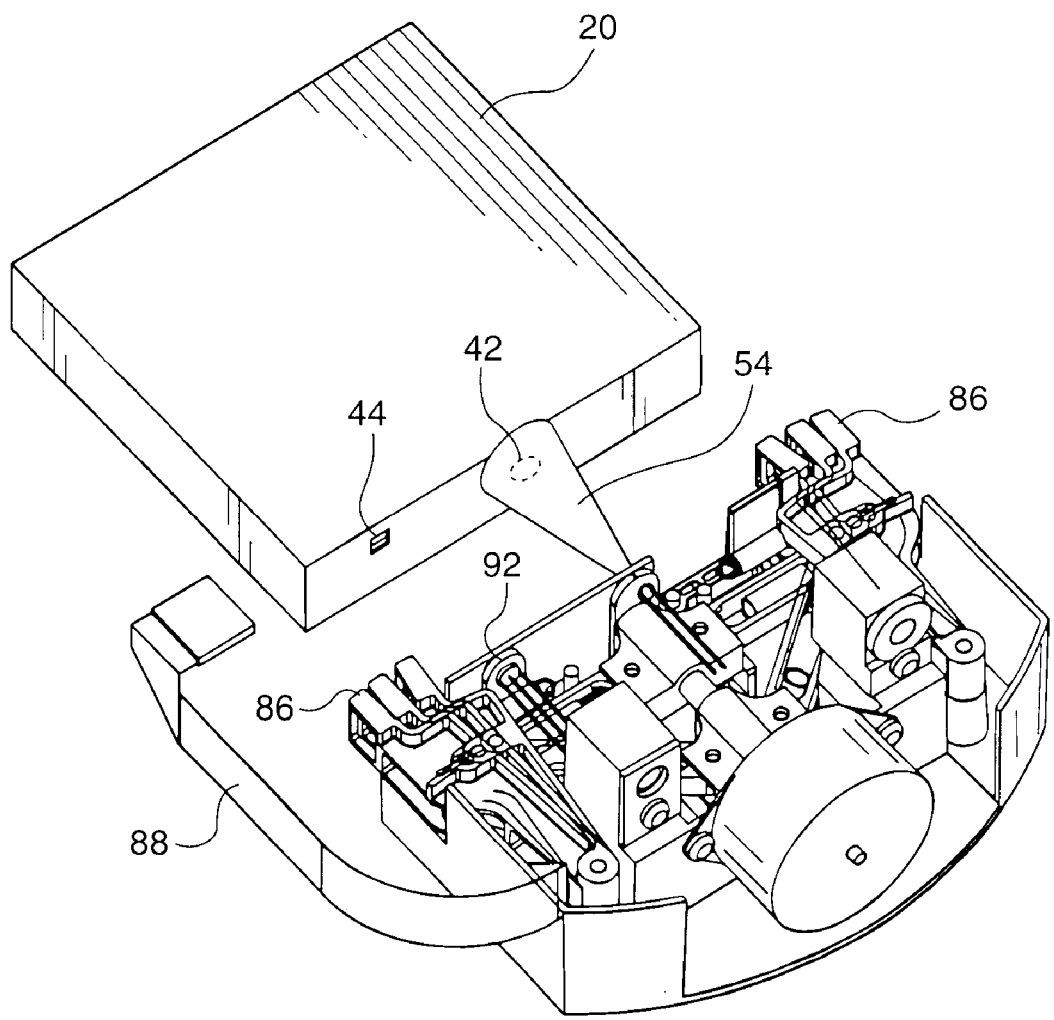
FIG. 3 is a bottom, front isometric view of the calibration cartridge and cartridge gripper of FIG. 1, with a cover of the cartridge gripper removed.

When the cartridge gripper 22 is situated proximate the calibration cartridge 20 in a calibration position in the manner shown in FIG. 1, FIG. 2, and FIG. 3, the receiving end 46 of electromagnetic transmissive channel 40 is nominally aligned to emitter 90 in the gripper 22. The electromagnetic detector 92 of the cartridge gripper 22 is proximate the radiation exit aperture 44 of the calibration cartridge 20 when the calibration cartridge 20 is in the calibration position, but whether the electromagnetic radiation emitted from the radiation exit aperture 44 of the calibration cartridge 20 reaches the detector 92 depends on a position of the cartridge gripper 22 relative to calibration cartridge 20 as the cartridge gripper 22 is moved through a range of positions along differing directions or axes of movement.

The emitting end 48 of electromagnetic transmissive channel 40 is positioned relative to features on calibration cartridge 20, which features locate the calibration cartridge 20 to small tolerances. The receiving aperture of radiation reception port 42 and the radiation exit aperture 44 are located with small tolerances to predetermined distances relative to cartridge bottom wall 31 and cartridge sidewalls 33, 34.

The example library 60 depicted in FIG. 4 is just one type of library with which the calibration cartridge 20 can be utilized, and should be understood not to be limiting in any material respect regarding the calibration cartridge or method of usage thereof. For example, it is of no significance that the media cartridge section is organized in a rectangular format, as the same could acquire other configuration. Other types of library configurations could be, for example, a carrousel type arrangement or a silo type arrangement having a central gripper or robot which has angular, radial, and height axes of movement.

Nor need the media cartridge section 62, calibration cartridge storage cell 70, and drive section 66 be organized or structured in any particular order or location, as these sections can be differently configured and organized differently. Further, any type of gripper, robot, or cartridge transport structure compatible with the calibration cartridge 20 may be utilized, not just the exemplary cartridge gripper 22 shown.

Figure 5A:
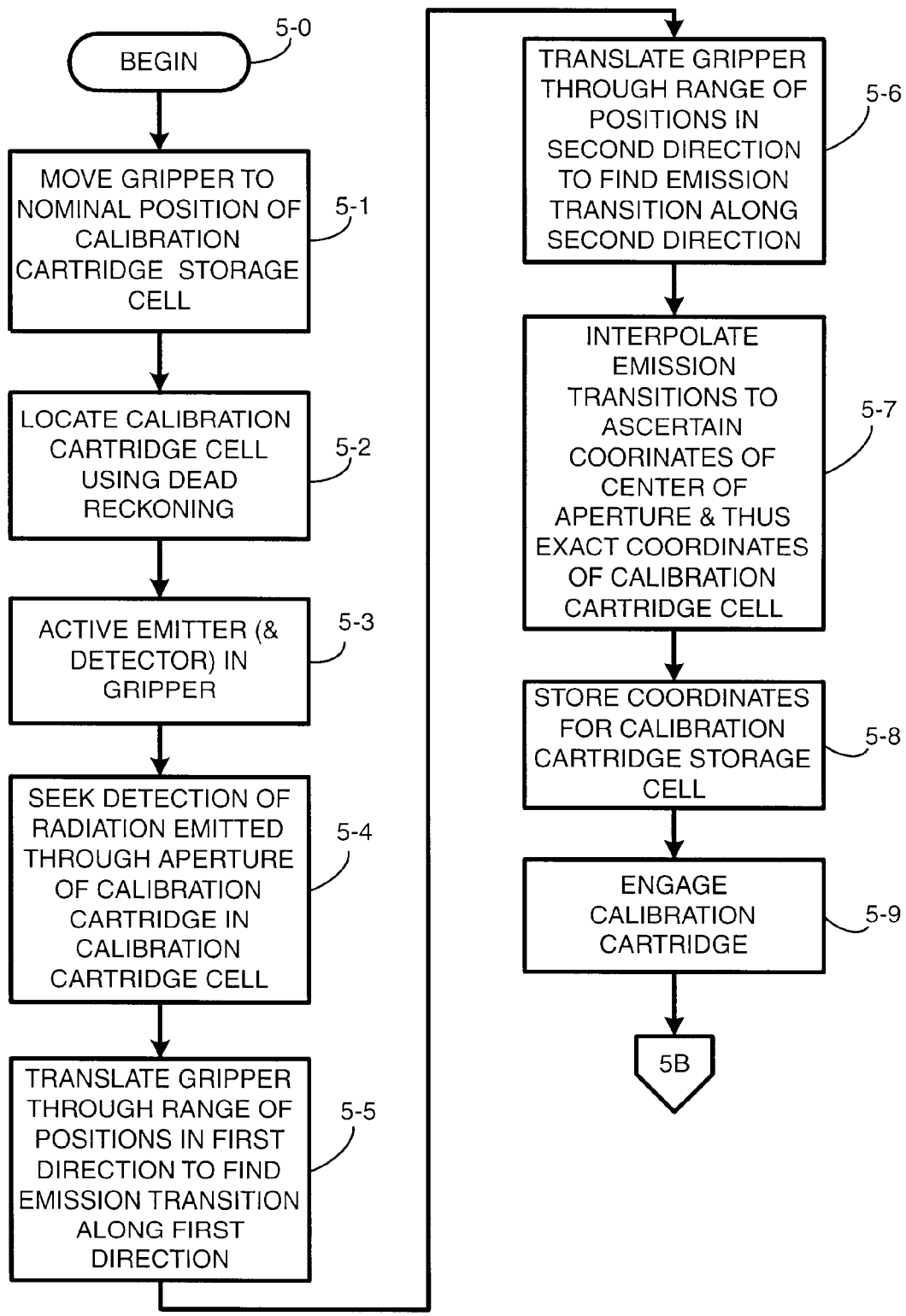
FIG. 5A and FIG. 5B are flowcharts showing basic example steps performed by the automated cartridge library of FIG. 1.
Figure 5B:
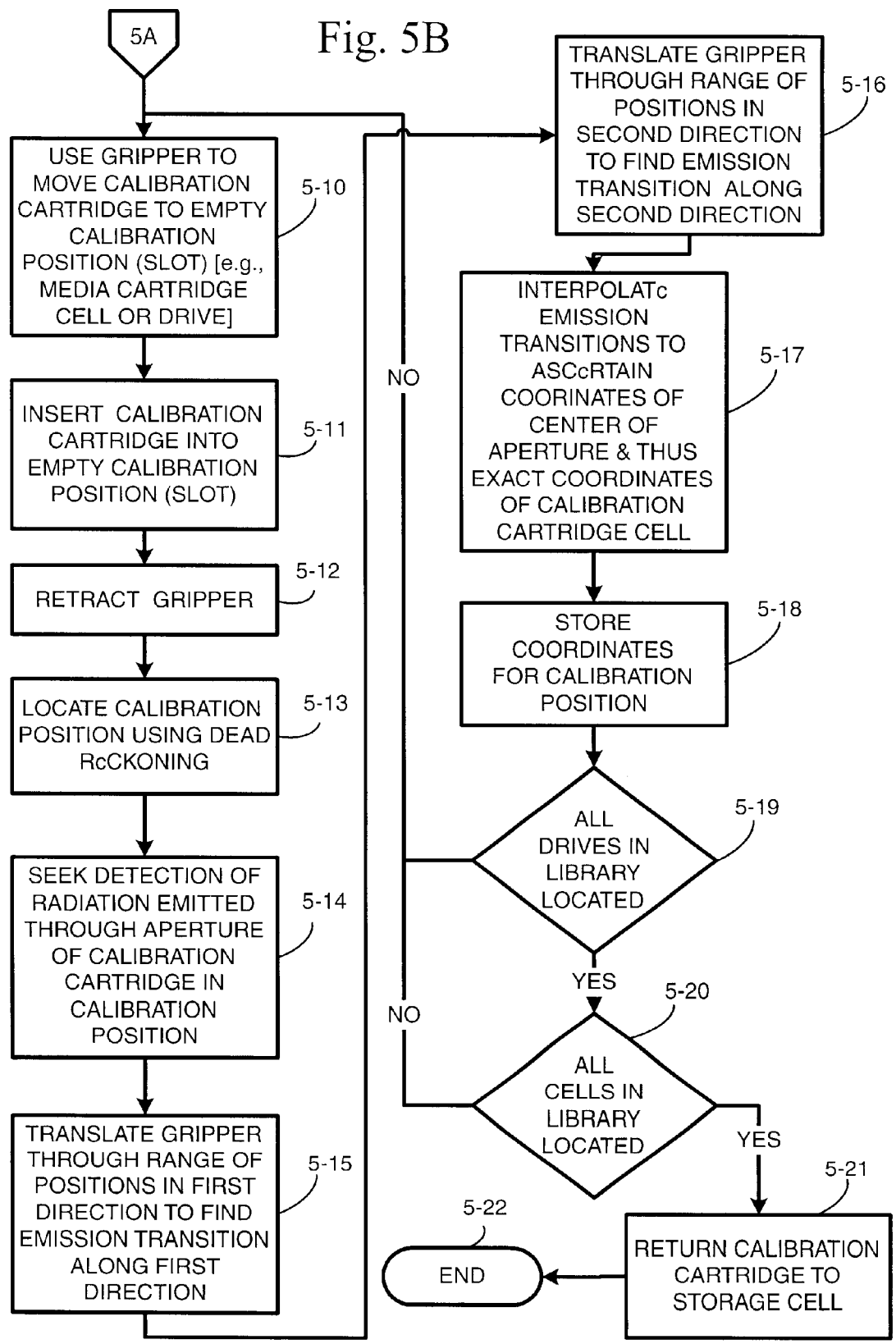

FIG. 5A and FIG. 5B show various basic, example steps involved in an example mode of a calibration procedure which utilizes the calibration cartridge 20. The calibration procedure is performed in order to calibrate, e.g., locate with precision, certain strategic locations (e.g., herein referred to as "calibration positions") to which cartridge gripper 22 must move in conjunction with normal library operation (e.g., transport of media cartridges between media cartridge-accommodating cells 64 and a drive 68), Step 5-0 of FIG. 5A depicts beginning of the calibration procedure. As step 51, the cartridge gripper 22 is moved by cartridge transport system 80 to a nominal position of the calibration cartridge storage cell 70, e.g., locating the cartridge gripper 22 is cell 70 is located using dead reckoning.

Step 5-2 reflects activation of emitter 90 and detector 92 in cartridge gripper 22. If the cartridge gripper 22 is reasonably well positioned in its storage cell 70, the electromagnetic radiation emitted by emitter 90 will be incident upon radiation reception port 42 of calibration cartridge, and thus upon the first end 46 of electromagnetic transmissive channel 40. Step 5-3 involves using detector 92 to detect radiation which may have been incident upon radiation reception port 42 and consequentially transmitted by electromagnetic transmissive channel 40. The electromagnetic radiation transmitted by electromagnetic transmissive channel 40 is emitted as cone 52 out of the second end 48 of electromagnetic transmissive channel 40, and thus directed as cone 96 out radiation exit aperture 44 toward detector 92, assuming reasonable alignment.

As step 5-4 the cartridge transport system 80 translates or moves cartridge gripper 22 through a range of positions in a first direction (e.g., along the X axis of FIG. 4). The purpose of movement of cartridge gripper 22 through the range of positions at step 5-4 is to locate edges of the cone 96 of radiation which exits the radiation exit aperture 44 (e.g., to ascertain locations of emission transitions), and ultimately a center of radiation exit aperture 44 (along the X axis). The center of radiation exit aperture 44 serves as a spatial description of the calibration position, e.g., of the calibration cartridge storage cell 70 in this phase of the calibration procedure. The spatial description of the calibration position can comprise or include, e.g., spatial coordinates of the calibration position in the X, Y, Z coordinate system of library 60.

The displacement of cartridge gripper 22 performed at step 5-4 is illustrated in FIG. 6A–FIG. 6E in conjunction with FIG. 7A–FIG. 7E. FIG. 6A–FIG. 6E basically depict the electromagnetic radiation cone 54 emitted from emitter 90 of cartridge gripper 22 relative to radiation reception port 42 of cartridge gripper 22, and a cone 96 of radiation exiting radiation exit aperture 44 relative to detector 92 of cartridge gripper 22. FIG. 7A–FIG. 7E show development of an example output signal of detector 92 as cartridge gripper 22 moves through the range of respective positions shown in FIG. 6A–FIG. 6B.

The output signal of detector 92 is a function of the amount of electromagnetic radiation exiting through radiation exit aperture 44, which in turn is a function of the position of cartridge gripper 22. The position p of cartridge gripper 22 at any particular time during its movement through the range of positions can be ascertained, e.g., by reference to stepper motor counts or the like which are indicative of the position. Alphabetical subscripts for the position p correspond to the respective one of FIGS. 6A–6E describing the position of cartridge gripper 22 at the time of the signal. In this regard, the positions $p_B$ and $p_D$ shown in FIG. 7B and FIG. 7D are locations of cartridge gripper 22 at which the output signal of detector 92 transitions relative to a threshold value (represented by the dotted line in FIG. 7A–FIG. 7E). In particular, position $p_B$ corresponds to the time illustrated in FIG. 6B at which the detector 92 begins to detect an above-threshold amount of electromagnetic radiation emitted from radiation exit aperture 44; the position $p_D$ corresponds to the time illustrated in FIG. 6D at which the detector 92 ceases to detect an above-threshold amount of electromagnetic radiation emitted from radiation exit aperture 44.

Figure 6A:
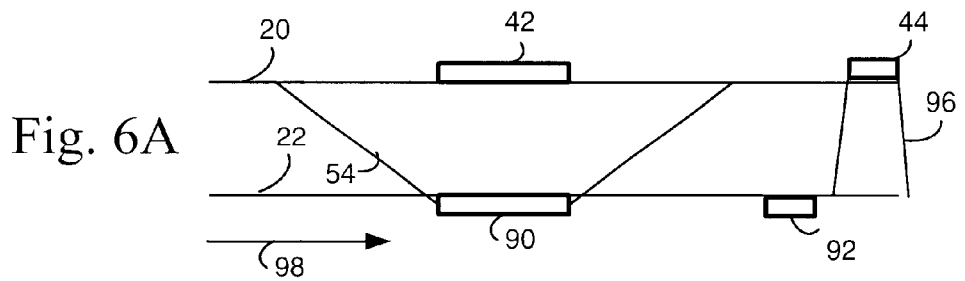
FIG. 6A–FIG. 6E are diagrammatic views of stages of a calibration procedure involving translation of a cartridge gripper relative to the calibration cartridge of FIG. 1.
Figure 6B:
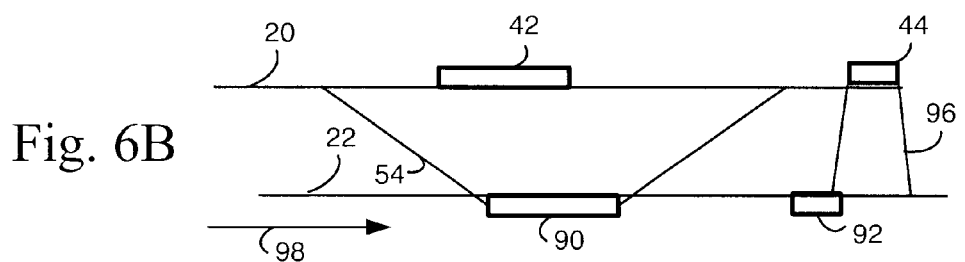
Figure 6C:
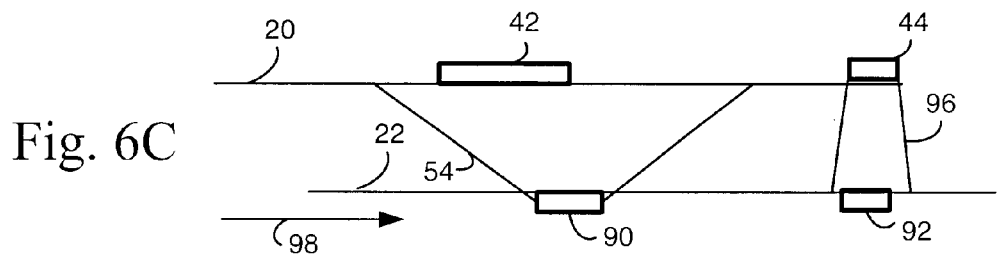
Figure 6D:
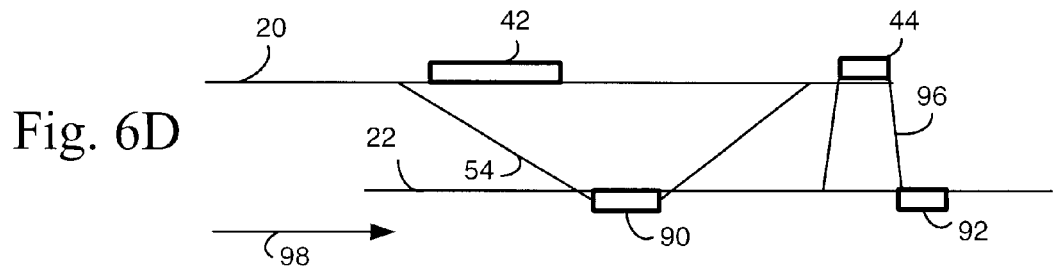
Figure 6E:
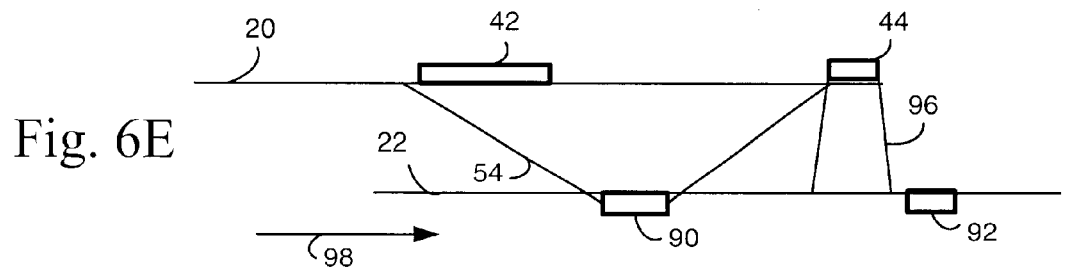
Figure 7A:
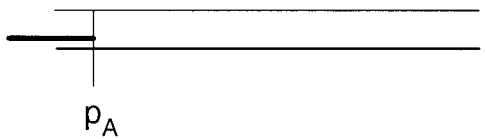
FIG. 7A–FIG. 7E are diagrammatic views of a developing output signal of a detector in a cartridge gripper at the respective stages of FIG. 6A–FIG. 6E.
Figure 7B:
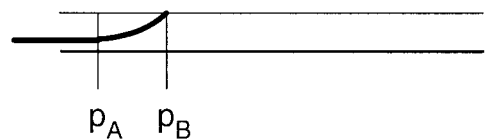
Figure 7C:
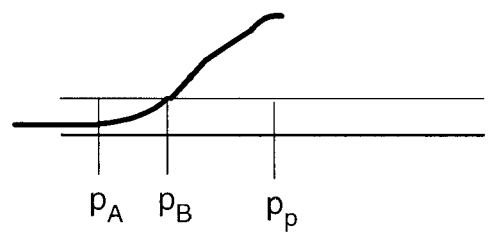
Figure 7D:
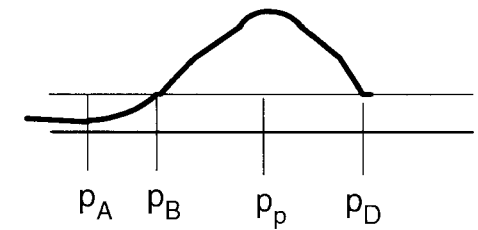
Figure 7E:
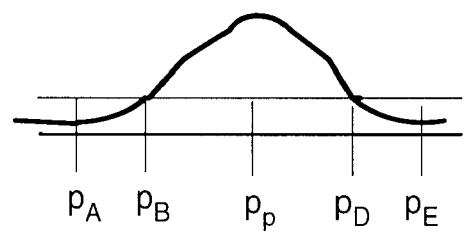
Figure 9:
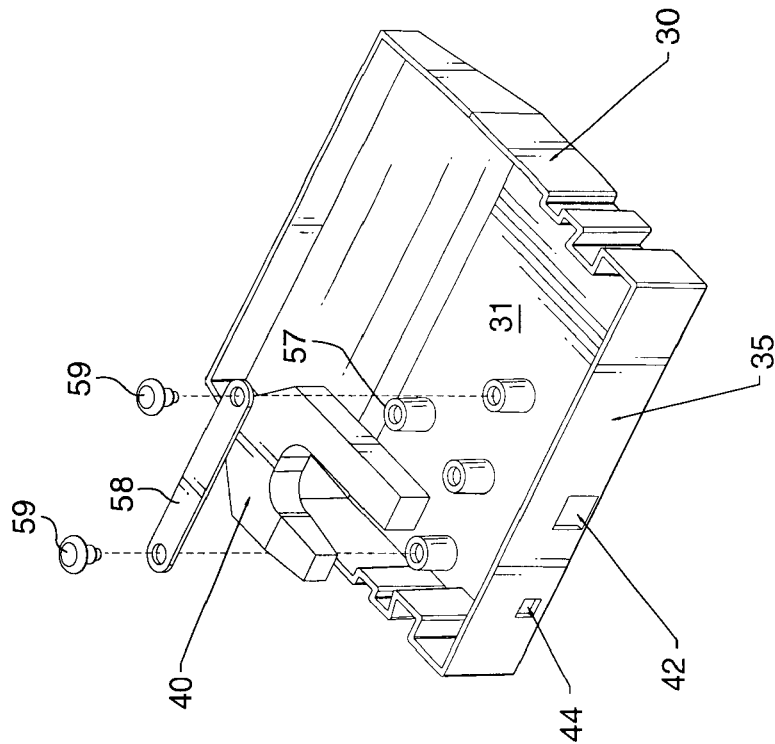
FIG. 9 is a top, front exploded isometric view of the calibration cartridge of FIG. 8.
Figure 8:
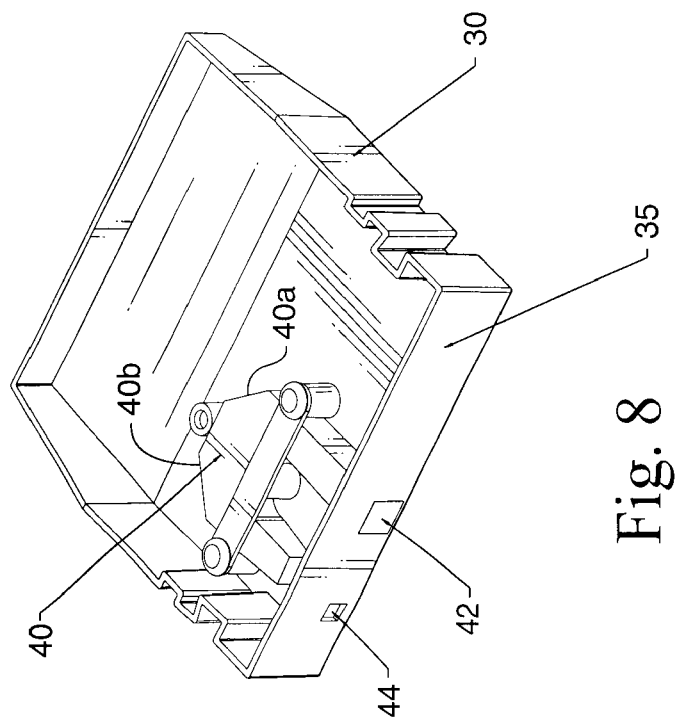
FIG. 8 is a top, front isometric view of an another example embodiment of a calibration cartridge, with a top cover of the calibration cartridge removed.
Figure 10:
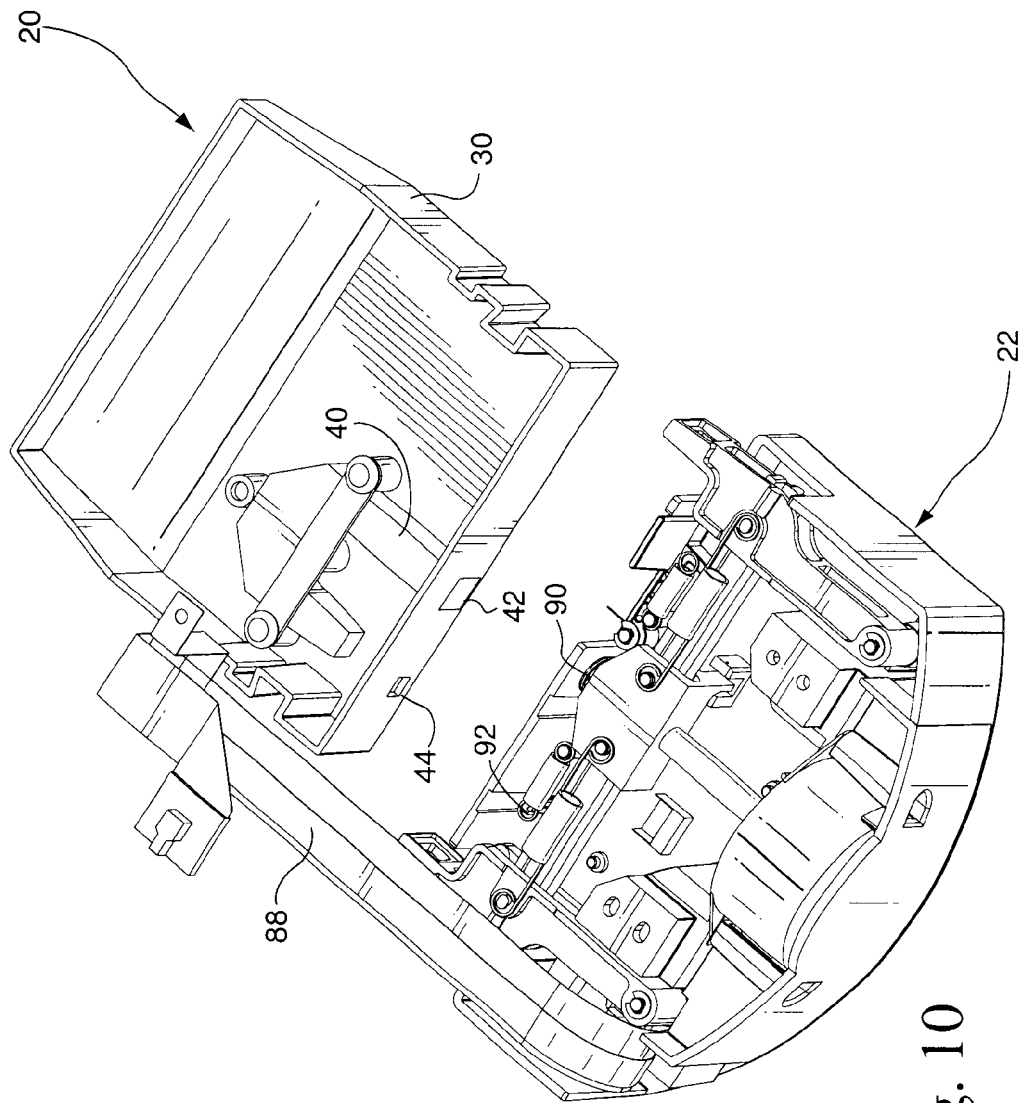
FIG. 10 is a top, front isometric view of the calibration cartridge of FIG. 8 proximate a cartridge gripper.
Figure 11:
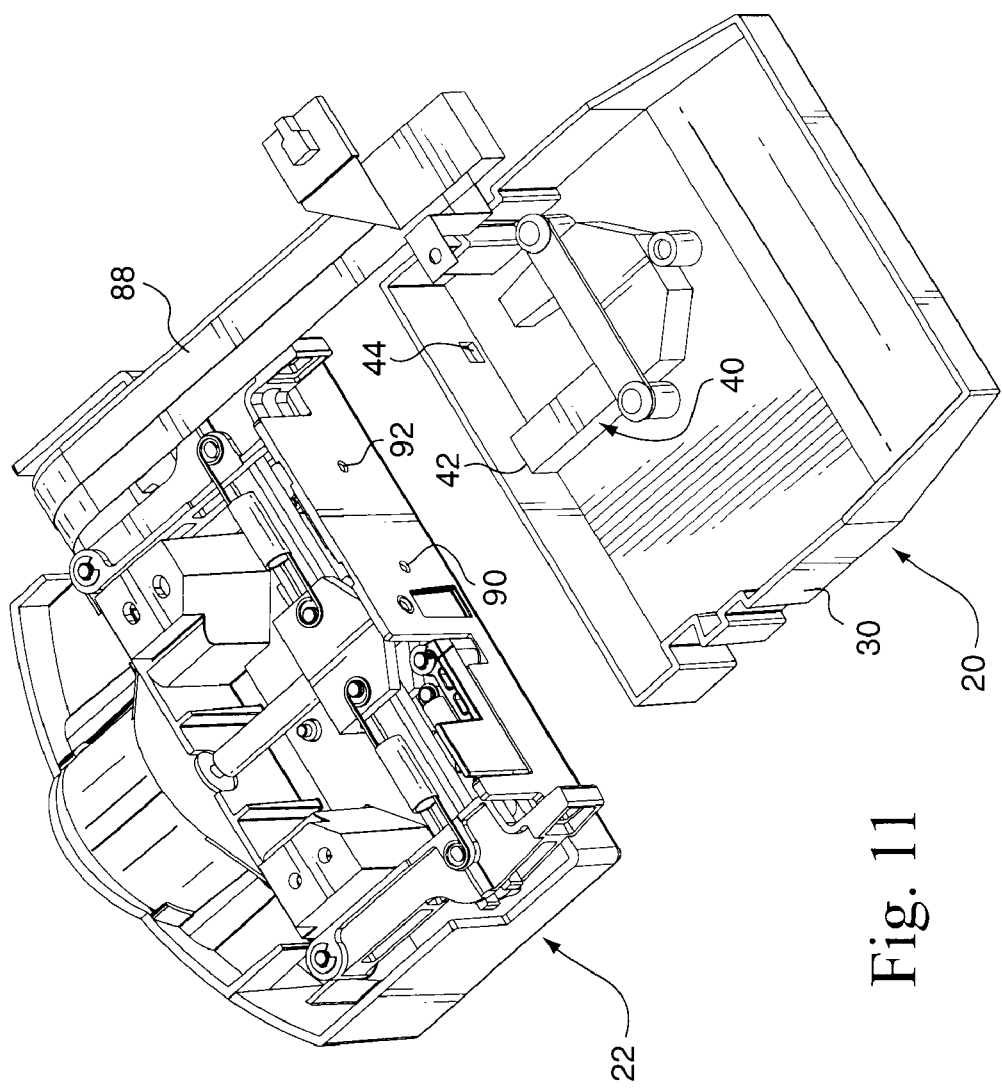
FIG. 11 is a top, rear isometric view of the calibration cartridge and cartridge gripper of FIG. 10.
Figure 12:
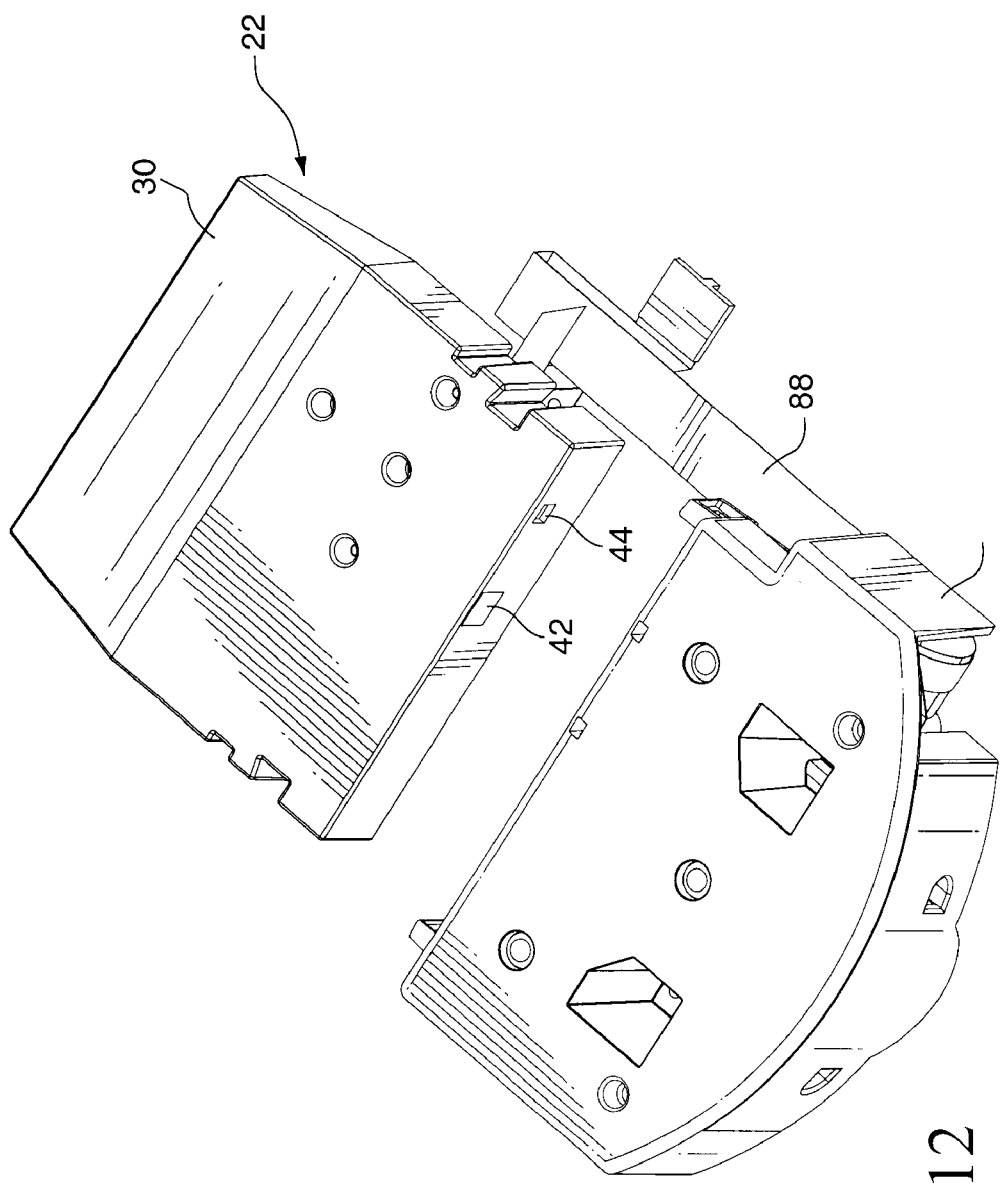
FIG. 12 is a bottom, front isometric view of the calibration cartridge and cartridge gripper of FIG. 10, with a cover of the cartridge gripper removed.

From FIG. 6A–FIG. 6E it can be seen that the electromagnetic radiation cone 54 is emitted from emitter 90 of cartridge gripper 22 with a sufficiently large dispersion angle whereby the radiation reception port 42 of the calibration cartridge remains irradiated as the cartridge gripper is translated through a range of positions in the first direction (e.g., in the direction of arrow 98 in FIG. 6A). At some positions in the range the detector 92 of the cartridge gripper 22 receives electromagnetic radiation emitted from the radiation exit aperture 44 of the calibration cartridge 20, and at other positions of the range the detector 92 does not receive the electromagnetic radiation emitted from the radiation exit aperture 44 of the calibration cartridge.

At step 5-5 the cartridge gripper 22 is translated through a range of positions in a second direction (e.g., along the Y axis of FIG. 4). The purpose of movement of cartridge gripper 22 through the range of positions at step 5-5 is to locate edges of the cone 96 of radiation which exits the radiation exit aperture 44 (e.g., emission transmissions), and ultimately a center of radiation exit aperture 44 (along the Y axis). Again, the center of radiation exit aperture 44 serves as a spatial description of the calibration position. The movement or translation of cartridge gripper 22 along the second axis works in essentially the same manner as the first axis translation of FIG. 6A–FIG. 6E, it being understood that movement in the second direction in the example embodiment would be in a direction orthogonal to the movement depicted in FIG. 6A–FIG. 6E.

Thus, the detector 92 of the cartridge gripper 22 detects locations of transitions in the emission of the cone 96 of electromagnetic radiation from radiation exit aperture 44 while the cartridge gripper respectively moves along the first direction (step 5-4) and the second direction (step 5-5). After locating the positions of such transitions, at step 5-6 of the calibration procedure for each direction the positions of the emission transitions are interpolated (e.g., averaged) to ascertain coordinates of a center of the radiation exit aperture 44, and thus exact coordinates of the calibration position which is currently occupied by the calibration cartridge 20. For example, the X coordinate along the X axis for the calibration position shown in FIG. 6A–FIG. 6E and FIG. 7A–FIG. 7E would be $(c_B+c_D)/2$. A similar interpolation is performed for the Y axis direction, resulting in a Y coordinate. The Z coordinate is known from the Z position of cartridge gripper 22.

It should be understood, however, that the interpolation for the first direction could instead be performed earlier (e.g., after step 5-4), with the interpolation for the second direction being performed subsequently rather than the interpolations for both directions being performed at step 5-6.

After the interpolation of step 5-6, as step 5-7 the interpolated coordinates representative of the center of radiation exit aperture 44, and thus the precise location of the calibration cartridge storage cell 70 now occupied by calibration cartridge 20, are stored in a memory.

At step 5-8 the calibration cartridge 20 is engaged by cartridge gripper 22. The calibration cartridge 20 will now be moved to each of the remaining calibration positions of library 60 for which positional calibration is required. For example, in one such mode of calibration procedure, the cartridge gripper 22 carries the calibration cartridge 20 to each of the cartridge-accommodating cells requiring calibration and cartridge-receiving slots of each of the drives of library 60, with a phase or subset of the calibration procedure being performed at each calibration position.

A phase of the calibration procedure for a calibration position of library 60 is illustrated by the set of steps comprising step 5-9 through step 5-17 shown in FIG. 5B. Such phase is repeated for each drive and each cartridge-accommodating cells needing locational calibration. It should be understood that a calibration phase can be performed for all cartridge-accommodating cells of the library, or only certain select cartridge-accommodating cells. For example, the calibration phase may be performed for a top cartridge-accommodating cell and a bottom cartridge-accommodating cell of a magazine, with interpolation being utilized to ascertain positions of cartridge-accommodating cells which are intermediate the top and bottom cells of the magazine.

As step 5-9, the cartridge gripper 22 is actuated to move the calibration cartridge 20 to a next calibration position requiring calibration. The actuation typically involves translation of cartridge gripper 22 along at least two, and perhaps all three, of the X, Y, and Z axes of FIG. 4. Of course, the calibration position should be empty prior to performance of the calibration procedure.

Step 5-10 shows the cartridge gripper 22 actually inserting the calibration cartridge 20 into the empty calibration slot which is the subject of this phase of the calibration procedure. After insertion of the calibration cartridge 20 into the slot of the calibration position, the cartridge gripper 22 is retracted (step 5-11). Then, as step 5-12, the calibration position is located using dead reckoning, e.g., using a prestored default position (e.g., coordinates) of the calibration position.

Step 5-13 through step 5-17 of the phase of the calibration procedure shown in FIG. 513 are essentially similar to step 5-3 through step 5-7 previously described relative to the calibration procedure for the calibration cartridge storage cell 70, but are instead performed for the calibration position which is the subject of this particular phase of the calibration procedure.

In the above regard, step 5-13 involves using detector 92 to detect radiation of the cone 96 emanating from radiation exit aperture 44. As step 5-14 the cartridge transport system 80 translates or moves cartridge gripper 22 through a range of positions in a first direction (e.g., along the X axis of FIG. 4) in order to locate the location of emission transitions from radiation exit aperture 44 along the first direction (e.g., X axis). At step 5-15 the cartridge gripper 22 is translated through a range of positions in a second direction (e.g., along the Y axis of FIG. 4) to locate the locations of the emission transmissions along the second direction (e.g., Y axis). After locating the locations of such transitions, at step 5-16 of the calibration procedure for each direction the emission transitions are interpolated (e.g., averaged) to ascertain coordinates of a center of the radiation exit aperture 44, and thus exact coordinates of the calibration.position which is currently occupied by the calibration cartridge 20 and thus involved in the current phase of the calibration procedure. As step 5-17 the interpolated coordinates representative of the center of radiation exit aperture 44, and thus the precise location of the calibration position now occupied by calibration cartridge 20, are stored in a memory.

Step 5-18 is a check to determine whether a phase of the calibration procedure has been performed for all drives 68 of library 60 requiring such locational calibration.

If a phase of the calibration procedure should be performed for a further drive 68, a new phase is begun as depicted by a return to step 5-9. If the locational calibration has been performed for all drives requiring such, a check is performed at step 5-19 whether the calibration procedure has been performed for all media cartridge-accommodating cells 64 of library 60 which require locational calibration. Presumably a separate phase (e.g., step 5-9 through step 5-17) is performed for each such media cartridge-accommodating cell 64. Once the calibration procedure has been performed for all media cartridge-accommodating cells 64 requiring calibration, as indicated by the affirmative decision from step 5-19 the calibration cartridge 20 is returned to its calibration cartridge storage cell 70. At this point, a spatial description (e.g., three dimensional coordinates) of each calibration position of the library 60 (e.g., calibration cartridge storage cell 70, the media cartridge-accommodating cells 64, and the drives 68) has been obtained, so that the calibration procedure can terminate (as indicated by step 5-20).

Emitter 90 and detector 92 in cartridge gripper 22 were activated at step 5-2. It should be understood that emitter 90 and detector 92 can remain activated throughout the calibration procedure, or alternatively that emitter 90 and detector 92 can be activated only periodically as needed (e.g., just before steps 5-3 through 5-5 and steps 5-13 through 5-15).

Thus, during the calibration procedure, the cartridge gripper 22 transports the calibration cartridge 20 to a calibration position whereat the calibration cartridge is inserted into one of a cartridge-accommodating cell of the library and the drive. The cartridge gripper 22 emits electromagnetic radiation incident upon the calibration cartridge 20. The electromagnetic radiation emitted from the cartridge gripper is transmitted via channel 40 through an interior portion of the calibration cartridge 20 to the radiation exit aperture 44 of the calibration cartridge 20. The electromagnetic radiation existing from the radiation exit aperture 44 of the calibration cartridge as cone 96 is used (e.g., detected) to ascertain a spatial description of the calibration position (e.g., spatial coordinates of the calibration position).

In the translation of the cartridge gripper 22 along the first direction (e.g., X axis) and second direction (e.g., Y axis), upon initially detecting the cone 96 emitted from radiation exit aperture 44 of calibration cartridge 20 the cartridge gripper 22 can be moved left & right (+X & −X) and up & down (+Y & −Y) in order to find the edges of radiation exit aperture 44. As mentioned above, the dispersion angle of the emitter 90 is large enough such that as the gripper 22 moves left & right and up & down, the receiving end 46 of the conductor remains illuminated as the detector 92 sees dark to light and then dark again. The position of these edges is then interpolated (see, e.g., step 5-6 and step 5-16) to determine the exact location of the aperture 44, and the exact location of calibration cartridge 20.

It is quite simple to locate the apertures in calibration cartridge 20 and in the gripper 22 to relevant physical features on each, thereby reducing the uncertainty of location.

Advantageously, with the calibration cartridge 20 the uncertainty of aiming the emitter or detector or predicting the position of the reflected light is avoided. Moreover, the prior art problem of supporting an emitter or detector on the robot (e.g., cartridge gripper 22) on the opposite side of a fixed aperture is mooted.

While the foregoing has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A calibration cartridge for an automated media library comprising:
   a cartridge case having a calibration surface;
   an electromagnetic transmissive channel which transmits electromagnetic radiation incident upon the calibration surface at a first position of the calibration cartridge so that the electromagnetic radiation travels interiorily through the calibration case and exits from the calibration cartridge at a radiation exit aperture at a second position on the calibration surface.

2. The apparatus of claim 1, wherein the electromagnetic transmissive channel is an electromagnetic conductor.

3. The apparatus of claim 2, wherein the electromagnetic transmissive channel is an optical fiber.

4. The apparatus of claim 2, wherein the electromagnetic transmissive channel is a light pipe.

5. The apparatus of claim 1, wherein the radiation exit aperture is a quadrilateral-shaped aperture at the second position.

6. The apparatus of claim 5, wherein the radiation exit aperture is a rectangular aperture.

7. The apparatus of claim 1, wherein the electromagnetic transmissive channel is situated in an interior of the cartridge case.

8. The apparatus of claim 1, wherein the electromagnetic transmissive channel has a first end which terminates at the first position on the calibration surface and a second end which directs electromagnetic radiation transmitted by the electromagnetic transmissive channel to the second position on the calibration surface.

9. The apparatus of claim 8, wherein the second end of the electromagnetic transmissive channel terminates interiorily in the cartridge case and directs the electromagnetic radiation to the radiation exit aperture.

10. The apparatus of claim 1, wherein the radiation exit aperture is a quadrilateral-shaped aperture.

11. An automated information storage library comprising:
    plural cells, each cell adapted to accommodate a media cartridge, the media cartridge containing an information storage media;
    at least one drive for transducing information with respect to the information storage media of a selected media cartridge inserted into the drive;
    a cartridge transport system;
    a calibration cartridge transportable by the cartridge transport system for insertion into one of the plural cells and the drive, the calibration cartridge-comprising:
       a cartridge case having a calibration surface;
       an electromagnetic transmissive channel which transmits electromagnetic radiation incident upon the calibration surface at a first position of the calibration cartridge so that the electromagnetic radiation travels interiorily through the calibration case and exits from the calibration cartridge at a radiation exit aperture at a second position on the calibration surface.

12. The apparatus of claim 11, wherein the cartridge transport system comprises cartridge gripper which selectively inserts the calibration cartridge into a calibration position in one of the plural cells and the drive; the cartridge gripper having an electromagnetic emitter and an electromagnetic detector, the electromagnetic emitter being positioned to be essentially aligned with the first position of the calibration cartridge when the calibration cartridge is in the calibration position and the cartridge gripper is proximate the calibration position.

13. The apparatus of claim 12, wherein a dispersion angle of the electromagnetic emitter has a predetermined relationship relative to the radiation exit aperture at the second position.

14. The apparatus of claim 11, wherein the electromagnetic transmissive channel is an electromagnetic conductor.

15. The apparatus of claim 14, wherein the electromagnetic transmissive channel is an optical fiber.

16. The apparatus of claim 14, wherein the electromagnetic transmissive channel is a light pipe.

17. The apparatus of claim 11, wherein the radiation exit aperture is a quadrilateral-shaped aperture at the second position.

18. The apparatus of claim 17, wherein the radiation exit aperture is a rectangular aperture.

19. The apparatus of claim 11, wherein the electromagnetic transmissive channel is situated in an interior of the cartridge case.

20. The apparatus of claim 11, wherein the electromagnetic transmissive channel has a first end which terminates at a first portion on the calibration surface and a second end which directs electromagnetic radiation transmitted by the electromagnetic transmissive channel to the second position on the calibration surface.

21. The apparatus of claim 20, wherein the second end of the electromagnetic transmissive channel terminates interiorily in the cartridge case and directs the electromagnetic radiation to the radiation exit aperture.

22. The apparatus of claim 21, wherein the radiation exit aperture is a quadrilateral-shaped aperture.

23. A calibration cartridge for an automated media library comprising:

a cartridge case having a calibration surface;

electromagnetic transmission means for transmitting electromagnetic radiation incident upon the calibration surface at a first position of the calibration cartridge so that the electromagnetic radiation travels interiorily through the calibration case and exits from the calibration cartridge at a radiation exit aperture at a second position on the calibration surface.

24. The apparatus of claim 23, wherein the electromagnetic transmissive channel is an electromagnetic conductor.

25. The apparatus of claim 24, wherein the electromagnetic transmissive channel is an optical fiber.

26. The apparatus of claim 24, wherein the electromagnetic transmissive channel is a light pipe.

27. The apparatus of claim 23, wherein the radiation exit aperture is a quadrilateral-shaped aperture at the second position.

28. The apparatus of claim 27, wherein the radiation exit aperture is a rectangular aperture.

29. The apparatus of claim 23, wherein the electromagnetic transmissive channel is situated in an interior of the cartridge case.

30. The apparatus of claim 23, wherein the electromagnetic transmissive channel has a first end which terminates at the first position on the calibration surface and a second end which directs electromagnetic radiation transmitted by the electromagnetic transmissive channel to the second position on the calibration surface.

31. The apparatus of claim 30, wherein the second end of the electromagnetic transmissive channel terminates interiorily in the cartridge case and directs the electromagnetic radiation to the radiation exit aperture.

32. The apparatus of claim 23, wherein the radiation exit aperture is a quadrilateral-shaped aperture.

33. An automated information storage library comprising:

plural cells, each cell adapted to accommodate a media cartridge, the media cartridge containing an information storage media;

means for transducing information with respect to the information storage media of a selected media cartridge;

a cartridge transport system;

a calibration cartridge transportable by the cartridge transport system for insertion into one of the plural cells and the transducing means, the calibration cartridge comprising:

a cartridge case having a calibration surface;

electromagnetic transmission means for transmitting electromagnetic radiation incident upon the calibration surface at a first position of the calibration cartridge so that the electromagnetic radiation travels interiorily through the calibration case and exits from the calibration cartridge at a radiation exit aperture at a second position on the calibration surface.

34. The apparatus of claim 33, wherein the cartridge transport system comprises cartridge gripper which selectively inserts the calibration cartridge into a calibration position in one of the plural cells and the transducing means; the cartridge gripper having an electromagnetic emitter and an electromagnetic detector, the electromagnetic emitter being positioned to be essentially aligned with the first position of the calibration cartridge when the calibration cartridge is in the calibration position, and the cartridge gripper is proximate the calibration position.

35. The apparatus of claim 34, wherein a dispersion angle of the electromagnetic emitter has a predetermined relationship relative to the radiation exit aperture at the second position.

36. The apparatus of claim 33, wherein the electromagnetic transmissive channel is an electromagnetic conductor.

37. The apparatus of claim 36, wherein the electromagnetic transmissive channel is an optical fiber.

38. The apparatus of claim 36, wherein the electromagnetic transmissive channel is a light pipe.

39. The apparatus of claim 33, wherein the radiation exit aperture is a quadrilateral-shaped aperture at the second position.

40. The apparatus of claim 39, wherein the radiation exit aperture is a rectangular aperture.

41. Thec apparatus of claim 33, wherein the electromagnetic transmissive channel is situated in an interior of the cartridge case.

42. The apparatus of claim 33, wherein the electromagnetic transmissive channel has a first end which terminates at the first position on the calibration surface and a second end which directs electromagnetic radiation transmitted by the electromagnetic transmissive channel to the second position on the calibration surface.

43. The apparatus of claim 42, wherein the second end of the electromagnetic transmissive channel terminates interiorily in the cartridge case and directs the electromagnetic radiation to the radiation exit aperture.

44. The apparatus of claim 43, wherein the radiation exit aperture is a quadrilateral-shaped aperture.

45. For use in an automated information storage library having a drive for transducing information relative to information storage media contained in a media cartridge, a method comprising:

using a cartridge gripper to transport a calibration cartridge to a calibration position whereat the calibration cartridge is inserted into one of a cartridge-accommodating cell of the library and a drive;

emitting electromagnetic radiation from the cartridge gripper incident upon the calibration cartridge;

transmitting the electromagnetic radiation emitted from the cartridge gripper through an interior portion of the calibration cartridge to a radiation exit aperture of the calibration cartridge;

using the electromagnetic radiation existing from the radiation exit aperture of the calibration cartridge to ascertain a spatial description of the calibration position.

46. The method of claim 45, further comprising using a electromagnetic radiation channel to transmit the electromagnetic radiation through the calibration cartridge.

47. The method of claim 46, further comprising using an optical fiber to transmit the electromagnetic radiation through the calibration cartridge.

48. The method of claim 46, further comprising using a light pipe to transmit the electromagnetic radiation through the calibration cartridge.

49. The method of claim 45, further comprising detecting at the cartridge gripper the electromagnetic radiation emitted from the radiation exit aperture of the calibration cartridge to ascertain the spatial description of the calibration position.

50. The method of claim 45, further comprising translating the cartridge gripper in a first direction to locate a first direction coordinate of the calibration position.

51. The method of claim 50, further comprising translating the cartridge gripper in a first direction to locate a first direction coordinate of a center of the radiation exit aperture.

52. The method of claim 50, further comprising translating the cartridge gripper in a second direction to locate a second direction coordinate of the calibration position.

53. The method of claim 50, further comprising translating the cartridge gripper in a second direction to locate a second direction coordinate of a center of the radiation exit aperture.

54. The method of claim 50, further comprising:
- emitting the electromagnetic radiation from the cartridge gripper upon a radiation reception port of the calibration cartridge; and
- detecting at a detector of the cartridge gripper transitions in the electromagnetic radiation emitted from the radiation exit aperture of the calibration cartridge to ascertain the spatial description of the calibration position.

55. The method of claim 54, further comprising emitting the electromagnetic radiation from the cartridge gripper with a sufficiently large dispersion angle whereby the radiation reception port of the calibration cartridge remains irradiated as the cartridge gripper is translated through a range of positions in the first direction, at some position in the range the detector of the cartridge gripper receiving electromagnetic radiation emitted from the radiation exit aperture of the calibration cartridge and at other positions of the range the detector not receiving electromagnetic radiation emitted from the radiation exit aperture of the calibration cartridge.

56. The method of claim 45, wherein the spatial description comprises spatial coordinates of the calibration position.

* * * * *